United States Patent [19]

Laurent

[11] Patent Number: 4,905,256
[45] Date of Patent: Feb. 27, 1990

[54] METHOD AND DEVICE FOR MULTISTATE MODULATION AND DEMODULATION WITH ADJUSTABLE PROTECTION LEVEL

[75] Inventor: Pierre A. Laurent, Bessancourt, France

[73] Assignee: Thomson CSF, Paris, France

[21] Appl. No.: 129,197

[22] Filed: Dec. 7, 1987

[30] Foreign Application Priority Data

Dec. 5, 1986 [FR] France ................. 86 17043

[51] Int. Cl.$^4$ ............................................. H04L 27/10
[52] U.S. Cl. ........................................ 375/48; 371/37.1
[58] Field of Search ..................... 375/48, 51, 89, 101, 375/53, 54, 56, 84, 85, 86; 371/37, 37.1

[56] References Cited

U.S. PATENT DOCUMENTS

| | | | |
|---|---|---|---|
| 3,860,874 | 1/1975 | Malone et al. | 375/89 |
| 4,020,461 | 4/1977 | Adams et al. | 371/37.1 |
| 4,096,442 | 6/1978 | McRae et al. | 375/101 |
| 4,404,532 | 9/1983 | Welti | 375/42 |
| 4,639,935 | 1/1987 | Jarnestedt et al. | 375/89 |

FOREIGN PATENT DOCUMENTS

| | | |
|---|---|---|
| 0144245 | 6/1985 | European Pat. Off. |
| 0171778 | 2/1986 | European Pat. Off. |
| 2137456 | 10/1984 | United Kingdom |

Primary Examiner—Benedict V. Safourek
Assistant Examiner—Marianne Huseman
Attorney, Agent, or Firm—Cushman, Darby & Cushman

[57] ABSTRACT

A method and device are provided for multistate modulation and demodulation with adjustable protection level, consisting in separating the binary signals, before demodulation, into critical and non critical signals, in attributing to the non critical signals all the states of the modulation and in attributing to the critical signals a reduced number of states which are, in the modulation diagram, the furthest removed from each other.

8 Claims, 2 Drawing Sheets

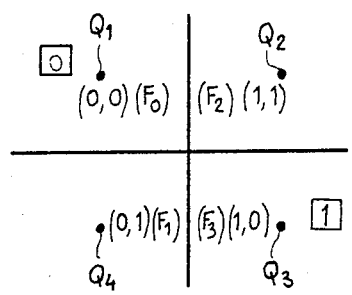
FIG_1
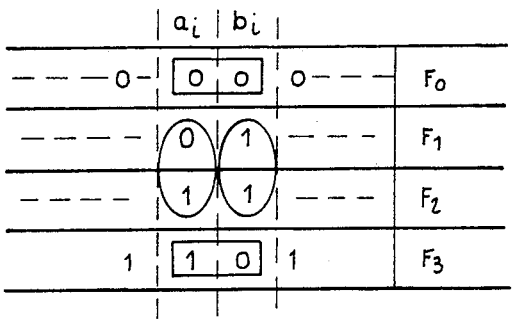
FIG_2
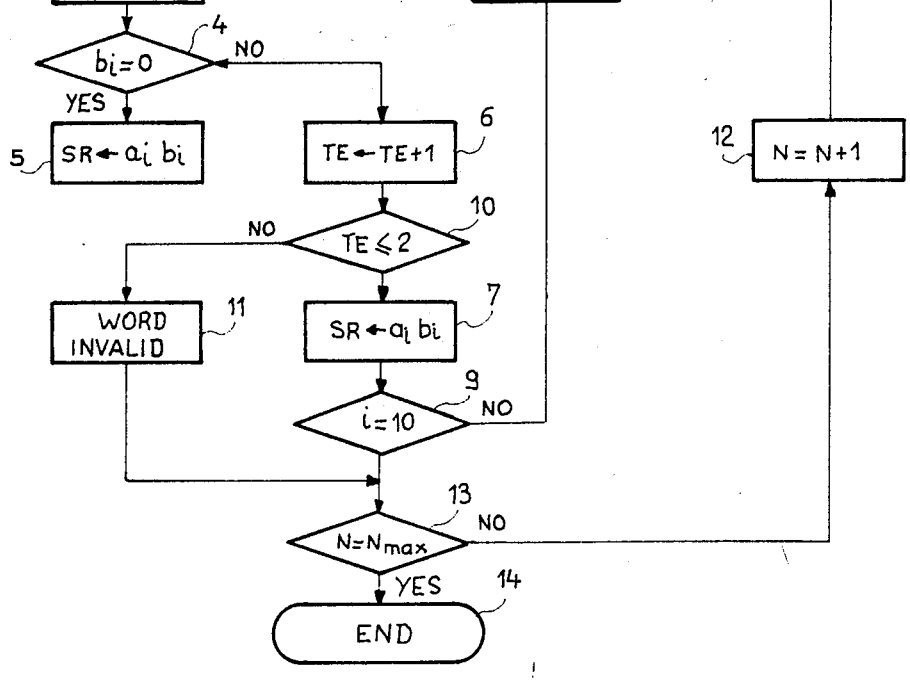
FIG_3

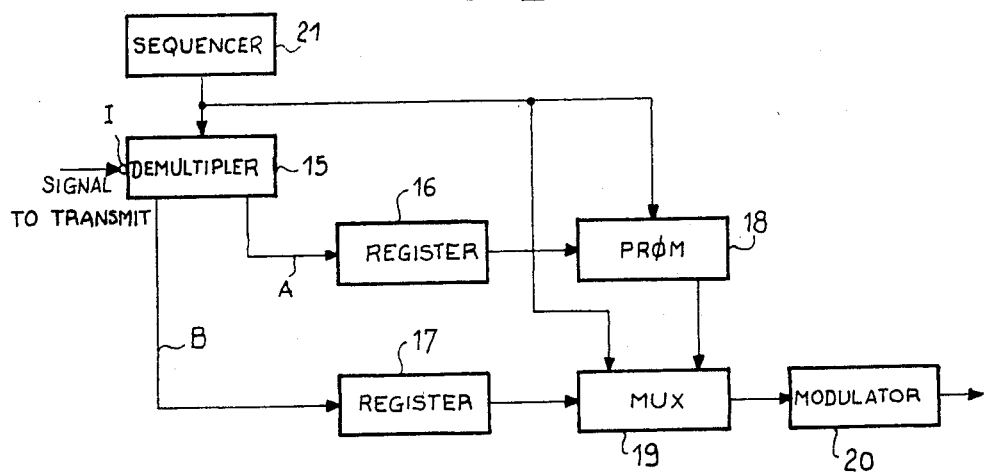
FIG_4
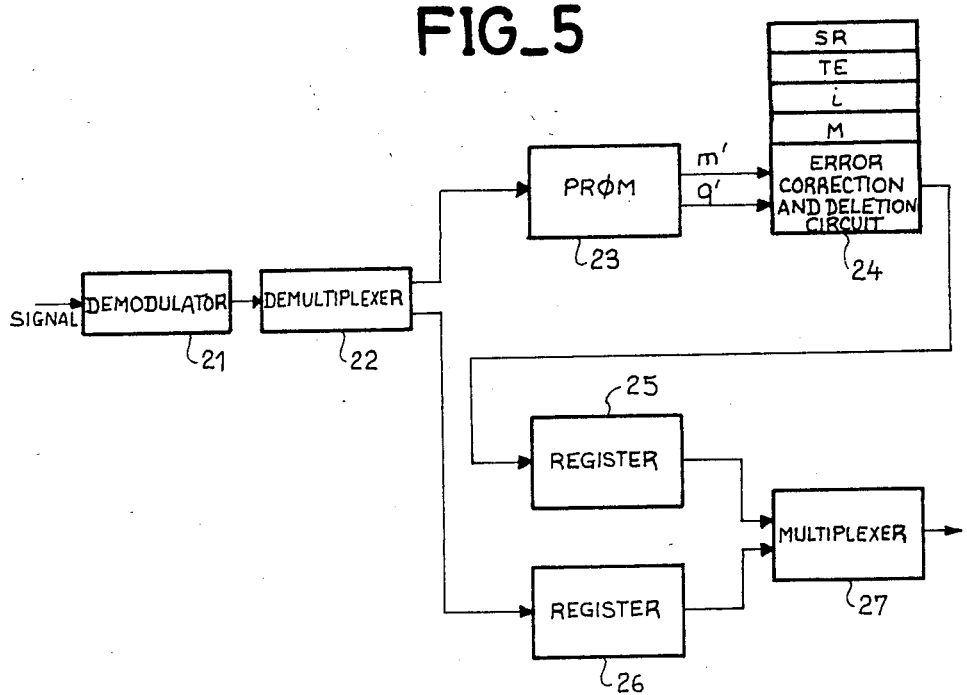
FIG_5

METHOD AND DEVICE FOR MULTISTATE MODULATION AND DEMODULATION WITH ADJUSTABLE PROTECTION LEVEL

BACKGROUND OF THE INVENTION

The present invention relates to a modulation and demodulation method and device with adjustable protection level.

It applies particularly to the construction of receiver-transmitters for narrow band digital radio-telephony and it relates more particularly to frequency or phase modulation systems of the 4FSK type with progressive transition in which the signalling element, also called the symbol, conveys two bits of information or dibits; FSK being the abbreviation for "Frequency Shift Keying".

In known modulation systems of 4FSK type, the signalling elements or symbols are organized in the form of two bits, called a dibit, with which modulation frequencies are associated. For example, with the dibit (0, 0) is associated a frequency Fo, with dibit (0, 1) is associated a frequency F1, with dibit (1, 1) is associated a frequency F2 and with dibit (1, 0) is associated a frequency F3, these frequencies being all different from each other.

The correspondence between dibit and transmitted frequency is determined so that there is only one difference bit between the dibits associated with two adjacent frequencies so as to make the error rate per bit minimum at reception.

Nevertheless, the presence of noise which normally accompanies each dibit generally affects this type of transmission, all the more so since the connections between transmitter and receivers are heavily loaded with noise. Under these circumstances, the risks of confusion between frequencies which are adjacent in the modulation diagram are increased and the quality of restoration of the original messages by the demodulator is affected.

For some transmissions, as is the case for example for the digital transmission of speech, confusion between adjacent frequencies is not troublesome for it minimally alters the restoration of the signal, and a relatively high error rate may further be accepted without that adversely affecting the intelligibility of the speech at reception.

On the other hand, for other transmissions, it is imperative for the restoration of the messages to be, if not perfect, at least more faithful. That is the case for example for transmitting the reference amplitude in speech transmission, for any alteration results in considerable fluctuations of the synthetic speech level obtained which adversely effects understanding. The fragility of the corresponding binary fields requires them to be accompanied by redundancy bits or error self correction code words, of BCH type for example, where BCH designates the codes known under the name Bose-Chaudhuri-Hocquenghem.

However, these codes, have possibilities which are often limited to the correction and detection of a reduced number of errors, and above a given number of errors the transmission must be rerun.

SUMMARY OF THE INVENTION

The aim of the invention is to overcome the above drawbacks.

For this, the invention provides a method for the multistate modulation and demodulation of binary signals with adjustable projection level, consisting of separating the binary signals, before modulation, into critical and non critical signals, and in attributing to the non critical signals all the states of the modulation and in attributing to the critical signals a number of states which, in the modulation diagram, are the furthest possible removed from each other.

BRIEF DESCRIPTION OF THE DRAWINGS

Other features and advantages of the invention will be clear from the following description with reference to the accompanying drawings which show:

FIG. 1, a known modulation diagram with four states of phase variation,

FIG. 2, a diagram for explaining the modulation principle used by the invention, FIG. 3, a flow chart reflecting the different steps of the method of the invention, and FIGS. 4 and 5 diagrams for forming a modulator and demodulator in accordance with the invention.

DESCRIPTION OF THE PREFERRED EMBODIMENTS

According to the known principle of modulation with four phase variation states, which is shown in FIG. 1, the symbols are coded by associating two binary elements ai and bi with each state for forming what is further called a dibit. In the representation shown in FIG. 1, the four states are shown at the four apices Q1, Q2, Q3, Q4 of a square, which correspond respectively to the dibits (0, 0), (0, 1), (1, 1), (1, 0). With each of these states is associated a frequency F0, F1, F2 or F3 so that, for example, for the dibit (0, 0) the modulator will transmit a frequency.

$$F0 = Fc - 3\frac{\Delta F}{2}, \text{ for the dibit (0, 1) it will transmit a frequency}$$

$$F1 = Fc - \frac{\Delta F}{2} \text{ for the dibit, (1, 1) it will transmit the frequency}$$

$$F2 = Fc + \frac{\Delta F}{2} \text{ and for the dibit (1, 0) it will transmit the frequency}$$

$$F3 = Fc + \frac{3\Delta F}{2}$$

In this type of modulation, the correspondance between dibits and frequencies is determined so that there is only one difference bit between the dibits associated with the adjacent frequencies, which reduces the error rate at reception to a minimum. However, so as to prevent dibit decoding errors from taking place at reception when the connections are highly disturbed, each of the bits of the messages transmitted to be protected more particularly are coded in the method of the invention into dibits so that for a bit (0) for example, there corresponds the dibit (0, 0) with a frequency F0 and to a bit (1) there corresponds a dibit (1, 0) with the transmission frequency F3. In this method, the frequencies F0 and F1, on the one hand, and F2 and F3, on the other, are considered as equivalent. To a bit (0) there then correspond the frequencies F0 and F1 corresponding to dibits (0, 0) and (0, 1); and to a bit (1) there correspond the frequencies F2 and F3 corresponding to dibits (1, 0) and (1, 1). The method makes it possible to considerably reduce the probability of error at reception since the transformation of a bit (1) into a bit (0) and vice versa amounts to confusing the two end frequencies used. This is, for a given signal/noise ratio, much rarer than confusion of two adjacent frequencies. An illustration of the method of the invention is shown in FIG. 2 where the four possible configurations of reception of dibits ai and bi are shown with the corresponding frequencies F0, F1, F2 and F3. In this FIG., the combinations of bits (ai, bi)=(0, 0) and (ai, bi)−(1, 0) correspond to the furthest removed frequencies F0 and F3 in the frequency distribution and the combinations of dibits (ai, bi)=(0, 1) and (ai, bit)=(1, 1) corresponds to the intermediate frequencies F1 and F2. From the coding plan shown in FIG. 2, each of the pairs (ai, bi) may be considered as being formed by an information bit (ai) to which is appended a quality bit bi. In fact, in both combinations (ai, bi)=(0, 0) and (ai, bi)=(0, 1) only the bit bi changes, whereas the critical bit ai keeps the value ai=0. It can also be seen that in both combinations (ai, bi)=(1, 1) and (ai bi)=(1, 0) only the bit bi changes whereas the bit ai keeps the value ai=1. Consequently, at reception, if the bit bi=1 in the dibit received, the transmission will have been poor and in this case no firm decision can be taken concerning the value of the corresponding information bit ai received. The corresponding decoded bit ai may then be deleted so as to be reconstituted if required for example by means of self correcting error code of the BCH type for example.

One embodiment of this method is shown by steps 1 to 14 of the flow chart of FIG. 3.

For carrying out this method, it is assumed that the demodulator of the reception device includes, in a way known per se, a counter of "N" bits, a counter of "i" bits, a word storage register "SR" and a deletion totaliser "TE". These latter may if required be formed by the corresponding registers of a microprocessor or by memory zones of the RAM which is associated therewith.

In the flow chart shown, each message received by the demodulator is formed of N words of 10 dibits (ai, bi) and the correcting code is assumed capable of correcting two deletions at most. At the beginning of reception, the word counter "N" is empty and the bit counter "i" is also empty as is shown in steps 1 and 2. The first dibit received is shown in step 3 and it is stored in the register "SR" by executing steps 4 and 5 provided that at step 4 the bit bi is zero. If at step 4, bit bi is not zero, the contents of the deletion totalizing counter "TE" is increased by a unit in step 6 and the dibit (ai, bi) is stored in the register SR in step 7. The process then returns to step 3 for receiving the next dibit (ai, bi) after increasing by a unit the contents of the dibit counter "i" in step 8. The procedure is renewed in this way until step 9 as long as the number of dibits received has not exceeded 10 and as long as the number of deletions totalized by the deletion totalizing counter "TE" in step 6 has not exceeded 2. This check, used in step 10, makes it possible to declare the word received invalid in step 11 if the totalizing counter "TE" has exceeded the value 2 and return to step 2 for demodulating the next word, by increasing by a unit the contents of the word counter N in step 12. The process stops at the execution of steps 13 and 14 when the number of words received has reached the total number N max of words coded in accordance with this process and contained in the frame of the transmitted message.

A diagram for constructing a modulation device in accordance with the invention is shown in FIG. 4. It includes a demultiplexer 15, word formation registers 16 and 17, a programmable read only memory PROM 18 for adding self correcting error redundancy bits, a multiplexer 19, a modulator 20 and a sequencer 21. The information to be transmitted is applied to an input I of the demultiplexer 15 so as to be divided over two separate channels A and B. The fragile information is transmitted over channel A into the word formation register 16. The non fragile word information is transmitted by channel B to the word formation register 17. The PROM 18 is addressed by the words contained in the word formation register 16, for each word it contains corresponding correction codes. The multiplexer 19 has two inputs connected respectively, one to the output of the word formation register 17, the other to the output of the PROM 18. This multiplexer 19 is controlled by sequencer 21 for applying to the input of modulator 20 the words coming either from memory 18 or from the word formation register 17. The modulator 20 transmits, in a way known per se, the four frequencies F0 to F3 defined by the modulation plans of FIGS. 1 and 2.

A diagram for the construction of a demodulation device in accordance with the invention is shown in FIG. 5. This device includes a demodulator 21, a demultiplexer 22, a first processing channel formed of a PROM 23 and an error correction and deletion circuit 24 coupled to a parallel-series register 25. It also includes a second processing channel formed of a parallel series register 26. The two processing channels are multiplexed through a multiplexer 27. All the messages received by the demodulator 21 are formed either of fragile information or of non fragile information using a frequency plan formed of the four above defined frequencies F0 to F3. The demultiplexer 22 ensures selection, in the message frames received, of the fragile and non fragile information for applying it, alternately depending on the case, to the input of the PROM 23 or directly to the registers 26. In both cases, the symbols forming the messages received are formed by dibits corresponding to the modulation plan of FIG. 2. In the case of fragile information, the corresponding dibits are separated by the PROM 23 into information bits M' and quality bits Q'. Since these bits are protected and are normally transmitted with binary type modulation, using the end frequencies F0 and F3 of the modulation plane, these dibits belong to error correcting code words which are read out from the PROM 18 of the modulator of FIG. 4. These error correcting codes correct, in a way known per se, both the non deleted bits and the deleted bits, defined in the modulation plan for the fragile information and make it possible to reconstitute the value of the transmitted symbols whose position is known in the message but whose quality is considered doubtful. Returning to the process described in FIG. 3, it will be readily understood that these error correcting codes make it possible to reconstitute at least two deleted bits if no error is detected in the code of the received messages.

Of course, the principle of the invention remains applicable to more complicated modulations. For example, from a basic modulation capable of conveying directly symbols of 8 bits (bytes) it can be readily understood that it is possible to obtain more protected modulations by using, among the 256 possible wave forms, only a subassembly of 128 chosen wave forms, as being the most distant possible, (7 bit symbol) or else of 64 wave forms (6 bit symbol) etc. . . or finally of only two (1 bit per symbol) so as to provide the maximum protection. In all these cases, by associating symbols with correcting codes, it will be decided as before that a symbol is valid if the decision of the demodulator shows that it belongs to the subassembly chosen (possibly to a close neighbor of a symbol of said subassembly) and it will be deleted in the opposite case.

What is claimed is:

1. A method for multistate modulation and demodulation of binary signals using a 4 FSK modulation scheme having four frequency states F0, F1, F2, F3 for conveying dibits of information comprising the steps of:
   separating the dibits to be transmitted into fragile and non-fragile dibits, said fragile dibits being dibits in which errors can be less tolerated;
   attributing to the non-fragile dibits all states of the modulation scheme; and
   attributing to the fragile dibits a reduced number of states of said modulation scheme, said reduced number of states being ones of said discrete frequencies having a largest possible difference from each other.

2. The method as claimed in claim 1, wherein the fragile dibits are accompanied by additional correcting error code signals.

3. The method as claimed in claim 1, wherein said four frequency states F0, F1, F2, F3 are defined with respect to a central frequency Fc such that:

$$F0 = Fc - 3\frac{\Delta F}{2},$$

$$F1 = Fc - \frac{\Delta F}{2}$$

$$F2 = Fc + \frac{\Delta F}{2}$$

$$F3 = Fc + \frac{3\Delta F}{2}$$

said ones of said frequencies being F0 and F3.

4. The method as claimed in claim 3, further comprising the step of coding information to be transmitted into dibits so as to form an information bit and a quality bit, storing each dibit received and testing the quality bit of each dibit received so as to check the validity of each of the words transmitted.

5. The method as claimed in claim 4, wherein said testing step includes declaring each word received as invalid above a predetermined number of unsuccessful tests of the quality bit.

6. The method as claimed in claim 5, wherein each word declared valid is corrected by means of an automatic error correcting code.

7. A multistate binary signal modulation device comprising:
   a demultiplier for separating fragile information, for which errors can be less tolerated from non-fragile information,
   a plurality of registers for reforming the fragile and non-fragile information into words of dibits,
   a programmable read only memory for adding to the fragile information redundancy bits for automatic error correction, and
   a modulator coupled to said multiplexer for transmitting alternately the dibits of the fragile and non-fragile information.

8. The device as claimed in claim 7, further comprising a demodulation device which includes a demultiplexer, a demodulator, coupled to said demultiplexer, for separating the dibits received representing the fragile and non-fragile information, a programmable read only memory for separating, in the dibits received of the fragile information, the information bits and the quality bit, the PROM being coupled to an error correction and deletion circuit for reconstituting the value of symbols transmitted whose position in a resultant message is known but whose quality is considered doubtful.

* * * * *